US012775549B2

(12) United States Patent
Matsumoto et al.

(10) Patent No.: US 12,775,549 B2
(45) Date of Patent: Oct. 27, 2026

(54) MEMORY SYSTEM CONFIGURED TO EXECUTE A READ-AND-VERIFY OPERATION AND CONTROL METHOD

(71) Applicant: Kioxia Corporation, Tokyo (JP)

(72) Inventors: Seiji Matsumoto, Yokohama (JP); Kazutoshi Noda, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/980,914

(22) Filed: Dec. 13, 2024

(65) Prior Publication Data

US 2026/0064586 A1 Mar. 5, 2026

(30) Foreign Application Priority Data

Aug. 29, 2024 (JP) ................................ 2024-147324

(51) Int. Cl.
*G06F 12/02* (2006.01)

(52) U.S. Cl.
CPC ................................ *G06F 12/0246* (2013.01)

(58) Field of Classification Search
CPC .................................................. G06F 12/0246
See application file for complete search history.

(56) References Cited

U.S. PATENT DOCUMENTS 9,619,321 B1 * 4/2017 Haratsch ................ G06F 3/064
2017/0123721 A1 * 5/2017 Sela ...................... G06F 3/0611
2021/0064289 A1 * 3/2021 Kanno .................. G06F 3/0604
2021/0286671 A1 * 9/2021 Amaki ................ G06F 11/1048
2021/0295941 A1 9/2021 Asami et al.
2022/0139466 A1 5/2022 Gorobets et al.
2023/0134281 A1 5/2023 Raimondo et al.
2023/0297262 A1 * 9/2023 Sasaki ................... G06F 3/0679 711/154
2023/0305745 A1 * 9/2023 Horspool ................ G06F 3/064
2024/0062839 A1 * 2/2024 Wang ................. G11C 16/3431
2024/0062840 A1 * 2/2024 Winterfeld .......... G11C 11/5671
2024/0289056 A1 * 8/2024 Redaelli ................ G06F 3/0604

FOREIGN PATENT DOCUMENTS

TW 202135082 A 9/2021

* cited by examiner

*Primary Examiner* — Ryan Bertram
(74) *Attorney, Agent, or Firm* — Oblon, McClelland, Maier & Neustadt, L.L.P.

(57) ABSTRACT

According to one embodiment, a memory system includes a nonvolatile memory including physical blocks, and a controller. Upon receiving a write command from a host, the controller starts to receive first data associated with the write command; selects one of a plurality of first pages, the plurality of first pages being physical pages to which second data has already been written and for which no read-and-verify operation has been executed; executes a read-and-verify operation for the selected one of the plurality of first page; and writes the received first data to a second page in a write destination block among the physical blocks.

9 Claims, 14 Drawing Sheets

MEMORY SYSTEM CONFIGURED TO EXECUTE A READ-AND-VERIFY OPERATION AND CONTROL METHOD

CROSS-REFERENCE TO RELATED APPLICATIONS

This application is based upon and claims the benefit of priority from Japanese Patent Application No. 2024-147324, filed Aug. 29, 2024, the entire contents of which are incorporated herein by reference.

FIELD

Embodiments described herein relate generally to a technology to control a nonvolatile memory.

BACKGROUND

In recent years, memory systems including nonvolatile memories have become widely used.

In writing data to a nonvolatile memory, the controller of a memory system executes a read-and-verify operation to determine whether the data written to the nonvolatile memory can be read normally.

In the memory system, the read-and-verify operation increases the time required for the data write operation.

It is therefore necessary to execute the data write operation with efficiency.

DETAILED DESCRIPTION

In general, according to one embodiment, a memory system connectable to a host, includes a nonvolatile memory including physical blocks, each of the physical blocks is a unit of a data erasure operation, and a controller electrically connected to the nonvolatile memory and configured to write data to the nonvolatile memory and execute a read-and-verify operation to determine whether the data is to be read from the nonvolatile memory normally. Each of the physical blocks includes physical pages, each of the physical pages is a unit of a data write operation and a data read operation. The controller is configured to, upon receiving a first write command from the host: start to receive first data associated with the first write command; select one of a plurality of first pages, the plurality of first pages being physical pages to which second data has already been written and for which no read-and-verify operation has been executed; execute a read-and-verify operation for the selected one of the plurality of first pages; and write the received first data to a second page in a write destination block among the physical blocks.

An embodiment will be described below with reference to the drawings.

Figure 1:
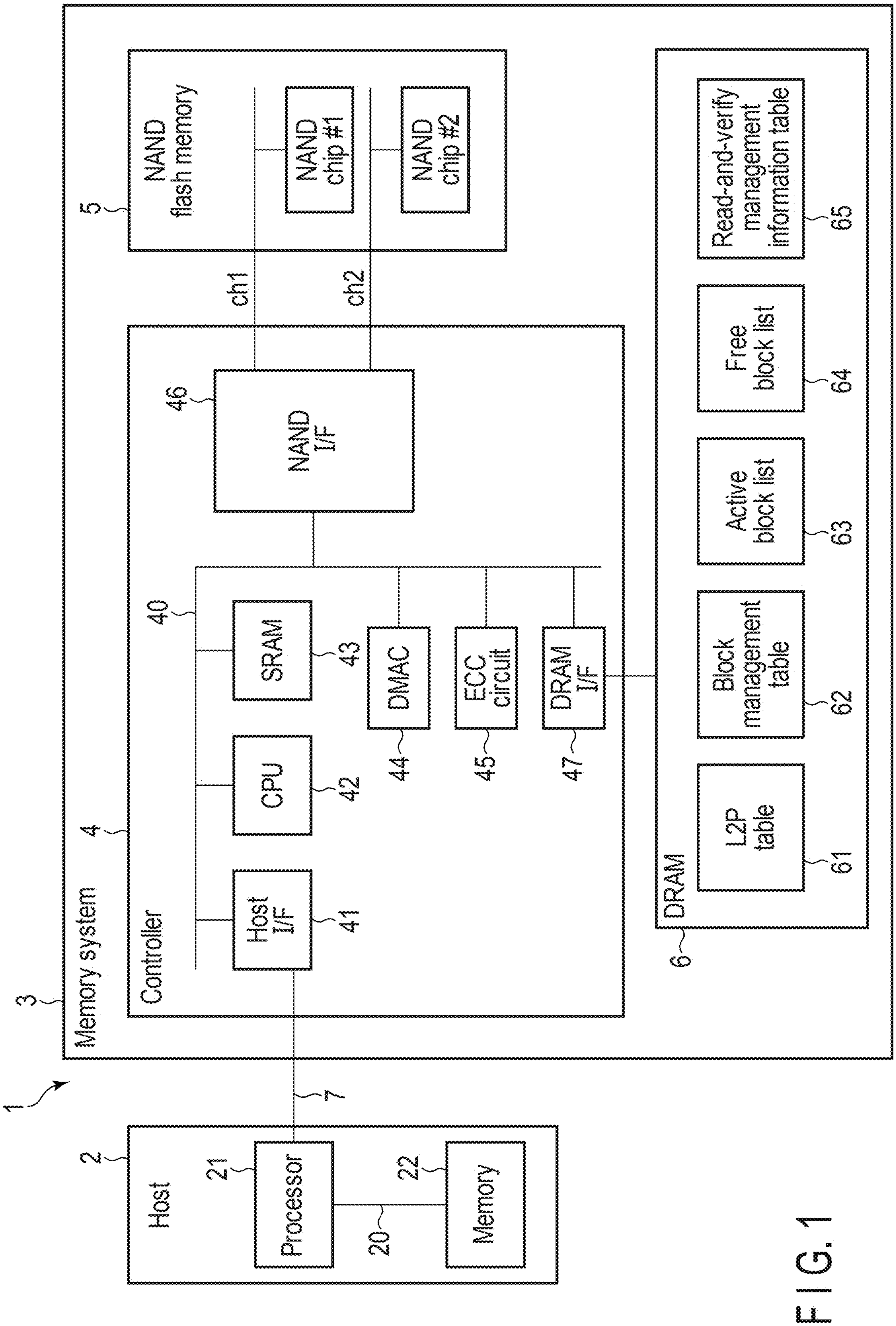
FIG. 1 is a block diagram showing an example of a configuration of an information processing system including a memory system according to an embodiment.

A configuration of an information processing system including a memory system according to the embodiment will be described. FIG. 1 is a block diagram showing an example of a configuration of an information processing system 1 including a memory system 3 according to the embodiment.

The information processing system 1 includes a host device (referred to as host) 2 and a memory system 3.

The host 2 is an information processing device configured to control the memory system 3. An example of the host 2 is a personal computer, a server computer, a handheld terminal, or an in-vehicle device.

The memory system 3 is a semiconductor storage device configured to write data to a nonvolatile memory and read data therefrom. The memory system 3 may be implemented as, for example, a solid state drive (SSD). The memory system 3 may conform to a secure digital (SD) card.

Communications between the host 2 and the memory system 3 are performed via a bus 7. The bus 7 is a transmission line connecting the host 2 and the memory system 3. The bus 7 is, for example, a PCIexpress™ (PCIe™) bus. The PCIe™ bus is a full duplex transmission line. The full duplex transmission line includes both a transmission line that transmits data and an input/output (I/O) command from the host 2 to the memory system 3 and a transmission line that transmits data and a response from the memory system 3 to the host 2. The I/O command is a command for writing data to the nonvolatile memory or reading data therefrom. The I/O command is, for example, a write command or a read command.

The write command is a command for making a request to write data to the memory system 3. The write command includes information indicating a start logical address, the size of data (referred to as write data) associated with the write command, and a data pointer. The start logical address is a logical address at the head of a logical address range corresponding to the write data. As the logical address, for example, a logical block address (LBA) is used. The size of the write data is represented, for example, by the number of LBAs (the number of sectors) in the logical address range corresponding to the write data. The data pointer is an address indicating a storage location in a memory 22 of the host 2 in which the write data is stored.

The read command is a command for making a request to read data from the memory system 3. The read command includes information indicating a start logical address, the size of data (read data) to be read, and a data pointer. The start logical address is a logical address at the head of a logical address range corresponding to the read data. The size of the read data is represented by the number of LBAs (the number of sectors) in the logical address range corresponding to the read data. The data pointer is an address indicating a storage location in the memory 22 of the host 2 to which the read data is to be transferred.

As the standard of a logical interface for connecting the host 2 and the memory system 3, for example, the NVM Express™ (NVMe™) standard is used. In the interface of the NVMe standard, communications between the host 2 and the memory system 3 are carried out using a pair of queues including at least one submission queue (SQ) and a completion queue (CQ) associated with the submission queue (SQ). This pair of queues is referred to as a submission queue/completion queue pair (SQ/CQ pair).

When issuing an I/O command, the host 2 stores an I/O command in the submission queue (SQ). Then, the memory system 3 accesses the submission queue (SQ) and fetches the I/O command to receive the I/O command. When the memory system 3 completes processing the received command, it stores a completion response to the processed command in the completion queue (CQ). The completion response includes, for example, information indicating that an operation for the issued command has been completed. The host 2 processes the completion response stored in the completion queue (CQ) to recognize that the operation for the issued command has been completed.

Next is a description of an example of a configuration of the host 2.

The host 2 includes a processor 21 and the memory 22. The processor 21 and the memory 22 are connected together via a bus 20.

The processor 21 is, for example, a central processing unit (CPU). The processor 21 executes software (referred to as host software) loaded into the memory 22. The host software is loaded into the memory 22 from the memory system 3 or another storage device connected to the host 2. The host software includes an operating system, a file system, a device driver, an application program, and the like. The processor 21 may also execute a plurality of applications.

The memory 22 is, for example, a volatile memory. The memory 22 is also referred to as a main memory, a system memory, or a host memory. The memory 22 is a random access memory such as a dynamic random access memory (DRAM). Part of the storage area of the memory 22 is used as a data buffer. The data buffer stores write data to be written to the memory system 3 by the host 2 or read data transferred from the memory system 3.

Next is a description of an example of a configuration of the memory system 3.

The memory system 3 includes a controller 4, a NAND flash memory 5, and a DRAM 6.

The controller 4 is a memory controller that controls the NAND flash memory 5. The controller 4 may be implemented by a circuit such as a system-on-a-chip (SoC). The controller 4 is electrically connected to the NAND flash memory 5.

The NAND flash memory 5 is a nonvolatile semiconductor memory. The NAND flash memory 5 includes a plurality of NAND chips. The NAND chip is also referred to as, for example, a memory chip, a flash die, and a memory die. The NAND chip includes a memory cell array having a plurality of memory cells arranged in a matrix. The NAND flash memory 5 may be a flash memory having a two-dimensional structure or a flash memory having a three-dimensional structure.

The DRAM 6 is a volatile memory. The storage area of the DRAM 6 is used, for example, to store information for managing the memory system 3. Part of the storage area of the DRAM 6 may be used to temporarily store data to be written to the NAND flash memory 5 or data read from the NAND flash memory 5.

The controller 4 includes a host interface circuit (host I/F) 41, a CPU 42, a static RAM (SRAM) 43, a direct memory access controller (DMAC) 44, an error correction and coding (ECC) circuit 45, a NAND interface circuit (NAND I/F 46) 46 and a DRAM interface circuit (DRAM I/F) 47. The host I/F 41, CPU 42, SRAM 43, DMAC 44, ECC circuit 45, NAND I/F 46, and DRAM I/F 47 are connected to each other via an internal bus 40.

The host I/F 41 is an interface circuit configured to perform communication with the host 2. The host I/F 41 is, for example, a PCIe controller. The host I/F 41 receives a variety of commands from the host 2. These commands are, for example, NVMe commands specified in the NVMe standard.

The CPU 42 is a processor. The CPU 42 controls the host I/F 41, SRAM 43, DMAC 44, ECC circuit 45, NAND I/F 46, and DRAM I/F 47. The CPU 42 loads a control program (firmware) from the NAND flash memory 5 or a ROM (not shown) into the SRAM 43 in response to the activation of the memory system 3. Then, the CPU 42 executes the loaded firmware to perform a variety of processes. Note that the firmware may be loaded into the DRAM 6 instead of the SRAM 43. The CPU 42 can perform a command operation or the like to execute various commands from the host 2. The operation of the CPU 42 is controlled by the foregoing firmware. Part or all of the command operation may be executed by dedicated hardware in the controller 4.

The SPAM 43 is a volatile memory. A part of the storage area of the SPAM 43 is used as a work area of the CPU 42. The other part of the storage area of the SRAM 43 can be used as a data buffer that temporarily stores data to be written to the NAND flash memory 5 or data read from the NAND flash memory 5.

The DMAC 44 is a circuit that executes direct memory access (DMA). The DMAC 44 transfers data between the memory 22 of the host 2 and the SRAM 43 or the DRAM 6.

The ECC circuit 45 performs an encoding operation or a decoding operation. The ECC circuit 45 performs the encoding operation when data is written to the NAND flash memory 5. In the encoding operation, the ECC circuit 45 adds a redundant code (parity) to the data to be written in the NAND flash memory 5. The redundant code is, for example, an error correction code (ECC). The ECC circuit 45 also performs the decoding operation when data is read from the NAND flash memory 5. In the decoding operation, the ECC circuit 45 corrects an error of data read from the NAND flash memory 5. The ECC circuit 45 uses the ECC added to the data when the error is corrected.

The NAND I/F 46 is a circuit that controls the NAND flash memory 5 under the control of the CPU 42. The NAND I/F 46 is electrically connected to a plurality of NAND chips in the NAND flash memory 5.

The NAND chips can be operated independently. Thus, the NAND chips function as a unit of parallel operation. The NAND I/F 46 is connected to each of channels ch1 and ch2. The NAND I/F 46 is connected to one or more NAND chips via its corresponding channel. FIG. 1 illustrates a case where one NAND chip is connected to each of the channels ch1 and ch2. In this case, the NAND I/F 46 is connected to a NAND chip #1 via the channel ch1. The NAND I/F 46 is connected to a NAND chip #2 via the channel ch2. Although the description has been made in the case where the number of NAND chips in the NAND flash memory 5 is two and the number of channels is two, the former and latter numbers are each may be three or more. Two or more NAND chips may be connected to one channel.

In the configuration of the NAND flash memory 5 shown in FIG. 1, the controller 4 can access the NAND chips #1 and #2 in parallel via two channels. The controller 4 can thus write or read data to or from the two NAND chips in parallel. In this case, the number of parallel accesses is two. Each of the NAND chips #1 and #2 may have a multiplane structure including a plurality of planes. If each of the NAND chips #1 and #2 includes, for example, four planes, the controller 4 can write or read data to or from a maximum of eight planes in parallel and, in this case, the number of parallel accesses is eight.

It is assumed that the communication speed between the host 2 and controller 4 executed by the host I/F 41 is lower than the communication speed between the controller 4 and NAND flash memory 5 executed by the NAND I/F 46. On this assumption, the NAND I/F 46 waits for data to be stored on the controller 4 when the data is transmitted to the NAND flash memory 5 based on the write command.

The DRAM I/F 47 is a circuit configured to control the DRAM 6 under the control of the CPU 42.

A part of the storage area of the DRAM 6 may be used to store information for managing the memory system 3. For example, the DRAM 6 includes an L2P table 61, a block management table 62, an active block list 63, a free block list 64, and a read-and-verify management information table 65.

The L2P table 61 is a table that manages a correspondence between a logical address and a physical address. The physical address is an address indicating a storage location in the NAND flash memory 5. The physical address is referred to as a physical block address (PBA), a memory block address (MBA), or the like. The L2P table 61 manages a correspondence between LBA and PBA in units of sectors, for example.

The block management table 62 is a table that manages physical blocks and superblocks in the memory system 3. The structure of the superblock will be described later. The block management table 62 includes, for example, information on a defective block among the physical blocks in the memory system 3 and information on a plurality of physical blocks constituting each superblock. The defective block is a block in which no data can be read or written normally. The defective block may also be referred to as a bad block.

The active block list 63 is a list of superblocks containing at least valid data. The valid data is data stored in a storage location indicated by a physical address associated with a logical address. For example, the data stored in a storage location indicated by the PBA referred to by the L2P table 61 is valid data. Also, the valid data is data that is likely to be read by the host 2. The superblock managed in the active block list 63 is a superblock allocated as a write destination block or a superblock for which data write has been completed, and a superblock that stores one or more items of valid data. The superblock managed in the active block list 63 may be referred to as an active block, for example.

The free block list 64 is a list of superblocks that store invalid data only. The invalid data is data that is stored at a storage location indicated by a physical address not associated with a logical address. For example, the data stored in a storage location indicated by the PBA that is not referenced to by the L2P table 61 is invalid data. Also, the invalid data is data that is not likely to be read by the host 2. The superblock managed in the free block list 64 is a superblock to which data can be newly written by performing a data erasure operation. The superblock managed in the free block list 64 is referred to as a free block, for example. The free block is a superblock that can be used for data write again.

The read-and-verify management information table 65 is a table that manages a read-and-verify management information. The read-and-verify management information is information indicating the progress of a read-and-verify operation executed for a superpage to which data is written. The structure of the superpage will be described later. For example, the read-and-verify management information is a superblock number indicating a superblock for which a read-and-verify operation is to be executed. In addition, the read-and-verify management information may be either a superblock number indicating a superblock for which a read-and-verify operation is to be executed and a superpage number indicating a superpage for which a next read-and-verify operation is to be executed.

Figure 2:
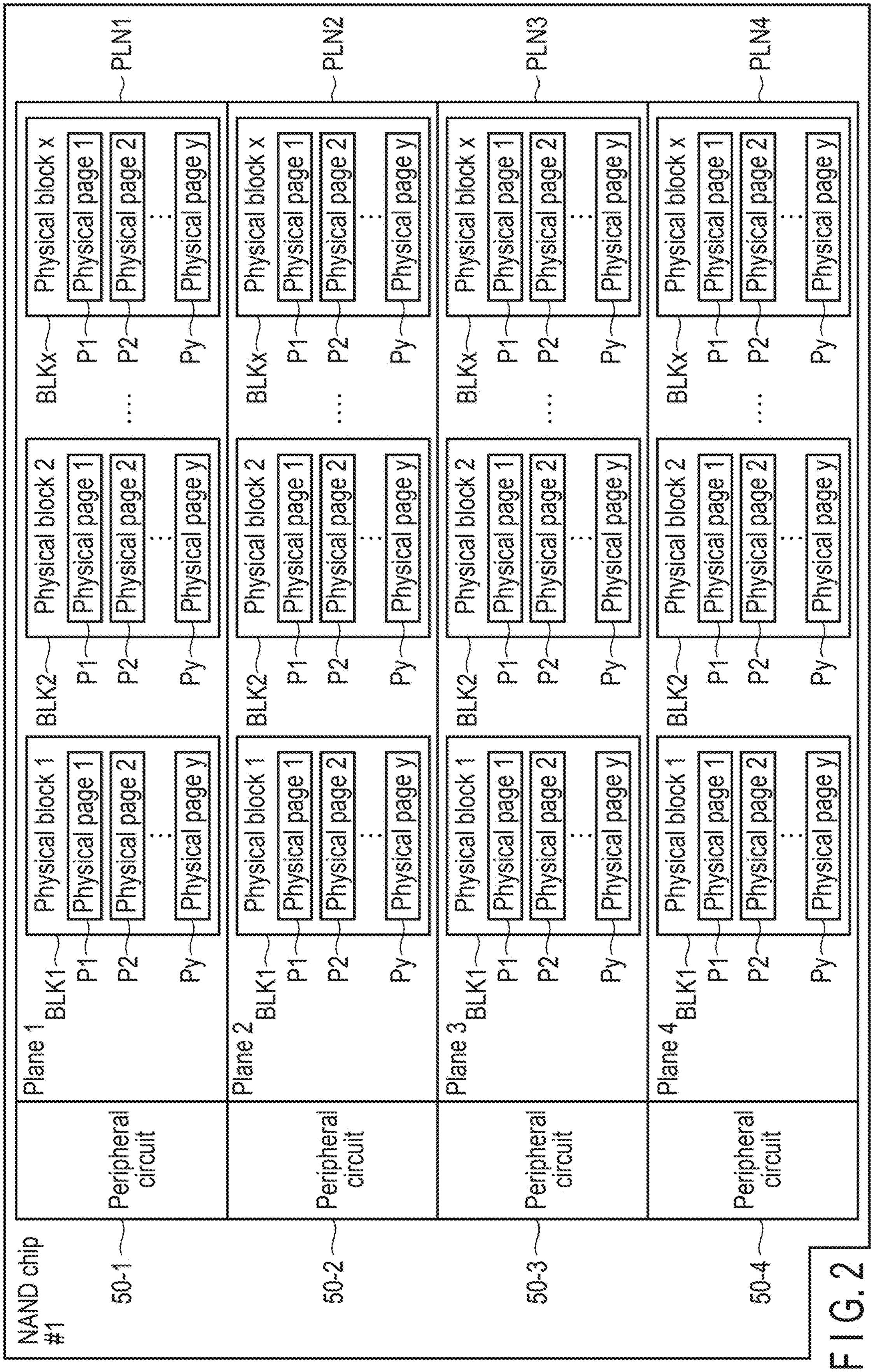
FIG. 2 is a diagram showing an example of a configuration of a memory chip in the memory system according to the embodiment.

Next is a description of an example of the internal configuration of a NAND chip. FIG. 2 is a diagram showing an example of a configuration of a NAND chip in the memory system 3 according to the embodiment. A NAND chip #1 is illustrated in FIG. 2 and will be then described by way of example with reference to FIG. 2. A NAND chip #2 may also have the same configuration as the NAND chip #1.

The NAND chip #1 includes four planes (planes PLN1, PLN2, PLN3 and PLN4) and their corresponding four peripheral circuits 50-1, 50-2, 50-3, and 50-4.

Each of the planes PLN1, PLN2, PLN3, and PLN4 includes a memory cell array. The memory cell array includes physical blocks BLK1 to BLKx. Each of the physical blocks is a unit of a data erasure operation. Each of the physical blocks BLK1 to BLKx is also referred to as a flash block or a memory block. Each of the physical blocks BLK1 to BLKx includes pages P1 to Py. Each of the pages P1 to Py is a unit of a data write operation and a data read operation. Each of the pages P1 to Py includes, for example, a plurality of memory cells connected to the same word line.

Each of the peripheral circuits 50-1, 50-2, 50-3, and 50-4 is a circuit that controls its corresponding plain memory cell array. The peripheral circuit 50-1 corresponds to the plane PLN1. The peripheral circuit 50-2 corresponds to the plane PLN2. The peripheral circuit 50-3 corresponds to the plane PLN3. The peripheral circuit 50-4 corresponds to the plane PLN4. Each of the peripheral circuits 50-1, 50-2, 50-3, and 50-4 includes, for example, a row decoder, a column decoder, a sense amplifier, and a page buffer. Each of the peripheral circuits 50-1, 50-2, 50-3, and 50-4 performs a data write operation, a data read operation, or a data erasure operation for its corresponding plain memory cell array upon receipt of an address and a command from the NAND interface 46.

Figure 3:
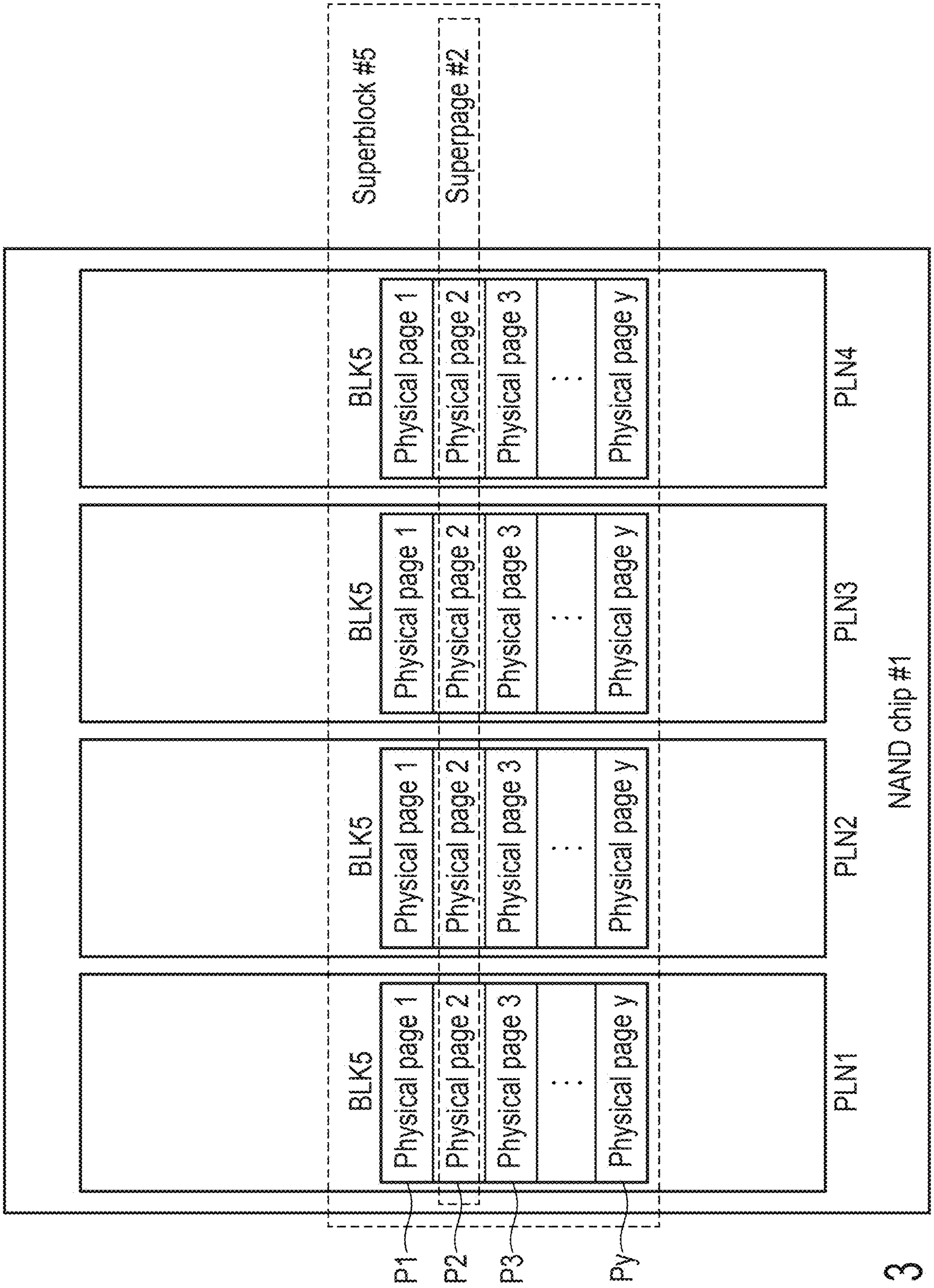
FIG. 3 is a diagram showing an example of a superblock managed in the memory system according to the embodiment.

Next is a description of a superblock and a superpage. FIG. 3 is a block diagram showing an example of a configuration example of a superblock in the memory system 3 according to the embodiment. The memory system 3 constitutes a superblock that is a set of physical blocks. The set of physical blocks is, for example, a set of physical blocks selected one by one from the planes that can be operated in parallel. The superblock is also referred to as a logical block or a block group. A superpage is a set of physical pages of each of the physical blocks constituting a superblock. A superpage is also referred to as a logical page or a page group. Here is a description of a case in which a superblock is configured by physical blocks selected one by one from each of the four planes in the NAND chip #1.

One superblock includes a total of four physical blocks selected one by one from each plane of the NAND chip #1. In addition, if the NAND flash memory 5 includes a plurality of NAND chips that can be operated in parallel, one superblock may be configured, including physical blocks selected one by one from each plane of another NAND chip.

FIG. 3 illustrates a superblock #5 including four physical blocks. Here, the superblock #5 is configured by physical blocks BLK5 of the planes PLN1, PLN2, PLN3, and PLN4 of the NAND chip #1.

The controller 4 can execute a data erasure operation in units of superblocks. That is, if all data items in the superblock #5 are invalid, the controller 4 executes a data erasure operation for the superblock #5. In the data erasure operation for the superblock #5, a data erasure operation is performed for each of the physical blocks BLK5 in the superblock #5.

In addition, the controller 4 can a perform data write operation in parallel for the physical blocks BLK5 constituting the superblock #5. In the data write operation, the controller 4 writes data to a superpage that is a set of physical pages selected one by one from each of the physical blocks BLK5. Then, the controller 4 can write a parity, which is used in restoring the read data, to at least one of the physical pages constituting a superpage.

In FIG. 3, a set of physical pages #2 of each of the physical blocks constituting the superblock #5 constitutes a superpage #2. For example, a parity can be written to the physical page 2 of the physical block BLK5 of the plane PLN4 in order to restore the data stored in the superpage #2.

Figure 4:
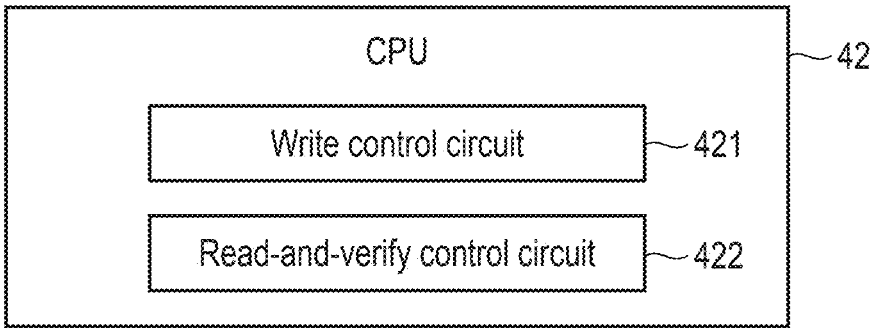
FIG. 4 is a diagram showing an example of a functional configuration of a CPU in the memory system according to the embodiment.

Next is a description of an example of a functional configuration of the CPU 42. FIG. 4 is a block diagram showing an example of a functional configuration of the CPU 42 in the memory system 3 according to the embodiment.

The CPU 42 executes firmware to provide the functions of a write control circuit 421 and a read-and-verify control circuit 422. Some or all of the functions may be provided by dedicated hardware in the controller 4.

The write control circuit 421 controls an operation of writing data to the NAND flash memory 5. Upon receiving a write command from the host 2, the write control circuit 421 performs the data write operation.

In the data write operation, first, the write control circuit 421 receives from the host 2 data and an LBA which are associated with the write command received from the host 2.

Then, the write control circuit 421 transfers the data received from the host 2, to the NAND flash memory 5, and provides instructions to write data.

Then, the write control circuit 421 receives data from the host 2 via the host I/F 41. The write control circuit 421 also transmits data to the NAND flash memory 5 via the NAND I/F 46. If, therefore, the data transfer rate at the NAND I/F 46 is higher than the data transfer rate at the host I/F 41, the NAND I/F 46 transfers data to the NAND flash memory 5 each time the data size of the write unit is received while waiting for the reception of data at the host I/F 41. In other words, a data reception waiting state occurs in the NAND I/F 46.

When data is written to the NAND flash memory 5, the write control circuit 421 updates the L2P table 61 such that the LBA specified by the received write command is associated with the physical address indicating the storage location of the NAND flash memory 5 to which the data is written. Then, the write control circuit 421 transmits a completion response corresponding to the processed write command to the host 2.

The read-and-verify control circuit 422 is a circuit that controls a read-and-verify operation in the memory system 3. In the read-and-verify operation, the read-and-verify control circuit 422 determines whether data written to the NAND flash memory 5 can be read normally.

In the read-and-verify operation, first, the read-and-verify control circuit 422 selects a read-and-verify target superpage from superpages to which data has already been written. The read-and-verify control circuit 422 selects a read-and-verify target superpage based on the read-and-verify management information, for example. In addition, the read-and-verify control circuit 422 may select a physical page as a read-and-verify target if a physical page is used as a write unit instead of a superpage in the memory system 3.

The read-and-verify control circuit 422 reads data from the selected read-and-verify target page. Then, the ECC circuit 45 performs a decoding operation for the read data. If the data is not read normally and the number of error bits in the read data is larger than a predetermined number, the ECC circuit 45 executes error correction of the data using, for example, the parity stored in the NAND flash memory 5. The parity may be stored in a free storage area of the SRAM 43 or DRAM 6 instead of being stored in the NAND flash memory 5.

Figure 5:
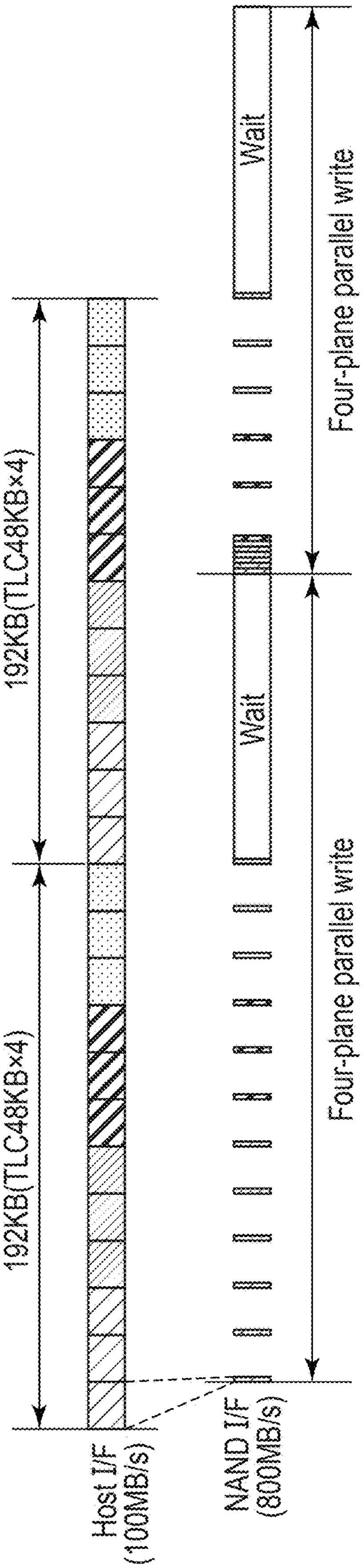
FIG. 5 is an illustration of data transfer in a data write operation in a first comparative example.

A data write operation in a first comparative example will be described below with reference to FIG. 5. FIG. 5 is an illustration of data transfer in a data write operation in the first comparative example. It is assumed in the first comparative example that no read-and-verify operation is executed in the data write operation.

The transfer rate of the host I/F is 100 MB/s. The transfer rate of NAND I/F 46 is 800 MB/s. That is, the transfer rate of the NAND I/F 46 is eight times higher than that of the host I/F.

Assume that the superblock to which data is written includes four physical blocks. Accordingly, the superpage to which data is written includes four physical pages.

The NAND flash memory 5 executes a TLC (triple-level cell) write operation of writing 3-bit data per memory cell. If the size of data to be written per page is 16 KB, 48 KB (16 KB×3) data per one physical page is written in a TLC mode.

Since, therefore, data is written in parallel to four physical pages constituting a superpage, at least 192 KB (48 KB×4) data is associated with one write command.

When the write data received from the host reaches 16 KB, the NAND I/F 46 transmits 16 KB write data to the NAND flash memory 5. In other words, the NAND I/F 46 transmits write data for each page size. Since the transfer rate of the NAND I/F 46 is higher than that of the host I/F 41, the NAND I/F 46 needs to wait for the size of the write data received from the host I/F 41 to reach 16 KB before transmitting the next write data to the NAND flash memory 5.

When 16 KB data is transferred 12 times, the NAND flash memory 5 receives 192 KB data and writes the data. The period during which data is being written is represented by Wait in FIG. 5. During this period, the NAND I/F 46 cannot transmit data to the NAND flash memory 5. In the data write, program operations are executed in parallel for four physical pages in the superpage.

When the transfer of write data associated with a first write command is completed, the host I/F 41 starts the transfer of write data associated with a second write command. During a program operation corresponding to the first write command in the NAND flash memory 5, the host I/F 41 receives data associated with the next write command.

When the program operation corresponding to the first write command is completed, the NAND I/F 46 starts to transfer the write data associated with the second write command to the NAND flash memory 5. Since write data of several pages is received from the host during the program operation, the NAND I/F 46 can transmit the write data of several pages continuously to the NAND flash memory 5 when the program operation is completed.

For the data associated with the next write command, when the write data received from the host 2 reaches 16 KB, the NAND I/F 46 transfers the write data of 16 KB to the NAND flash memory 5.

Upon receiving 192 KB write data by repeating the transfer of 16 KB write data, the NAND flash memory 5 executes a program operation to write the received data.

If the transfer rate of the NAND I/F 46 is higher than that of the host I/F 41, the NAND I/F 46 needs to wait until the write data reaches 16 KB.

Next, it is assumed that a read-and-verify operation is executed to determine whether data written to the NAND flash memory 5 can be read normally.

Figure 6:
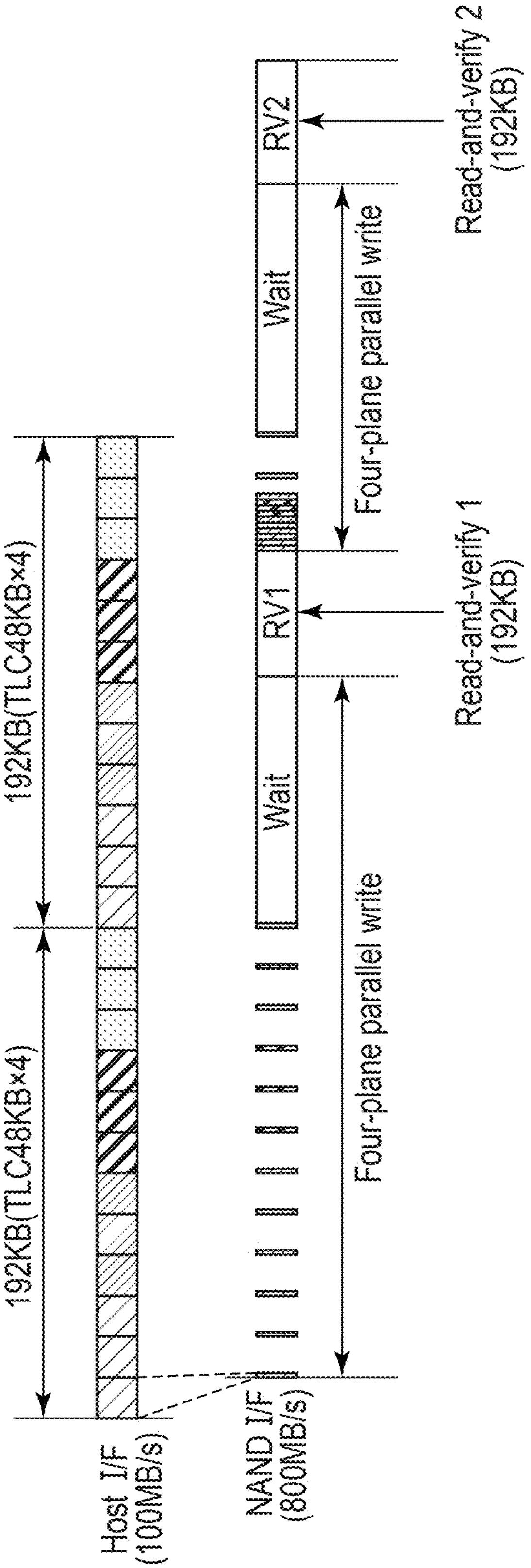
FIG. 6 is an illustration of data transfer in a data write operation in a second comparative example.

In a second comparative example, immediately after data is written to the NAND flash memory 5, a read-and-verify operation is executed for the written data. FIG. 6 is an illustration of data transfer in a data write operation in the second comparative example.

Like in FIG. 5, in FIG. 6, two write commands are transmitted from the host 2 to the memory system 3.

First, the controller 4 receives 192 KB data, which is associated with a first write command, via the host I/F 41. Each time the received data reaches 16 KB, the controller 4 transfers the data to the NAND flash memory 5 via the NAND I/F 46. If the received data reaches 192 KB, the NAND flash memory 5 performs a program operation to write the data.

When the program operation for the NAND flash memory 5 completes, the controller 4 executes a read-and-verify operation RV1. Then, the controller 4 selects a superpage to which data is written by the last program operation, as a target for the read-and-verify operation RV1. That is, the data written to the NAND flash memory 5 is read and verified by the controller 4 immediately after the program operation.

In the read-and-verify operation RV1, the controller 4 reads from the NAND flash memory 5 data written based on the first write command. Then, the controller 4 determines whether an error of the read data can be corrected.

When the host I/F 41 completes transferring the write data associated with the first write command to the NAND flash memory 5, it starts to transfer the write data associated with the second write command to the NAND flash memory 5. In the NAND flash memory 5, therefore, the host I/F 41 receives data associated with the next write command even during the program operation and a read-and-verify operation corresponding to the first write command.

When the program operation and the read-and-verify operation corresponding to the first write command complete, the NAND I/F 46 starts to transfer the write data associated with the second write command to the NAND flash memory 5. Since write data of several pages is received from the host 2 during a program operation and a read-and-verify operation, the NAND I/F 46 can transmit the write data of several pages continuously to the NAND flash memory 5 upon completion of the read-and-verify operation.

For the data associated with the next write command, when the write data received from the host 2 reaches 16 KB, the NAND I/F 46 transfers the write data of 16 KB to the NAND flash memory 5.

Upon receiving 192 KB write data by repeating the transfer of 16 KB write data, the NAND flash memory 5 executes a program operation to write the received data.

When the program operation for the NAND flash memory 5 completes, the controller 4 executes a read-and-verify operation RV2. Then, the controller 4 selects a superpage to which data is written by the last program operation, as a target for the read-and-verify operation RV2. That is, the data written to the NAND flash memory 5 is read and verified by the controller 4 immediately after the program operation.

In the read-and-verify operation RV2, the controller 4 reads from the NAND flash memory 5 data written based on the second write command. Then, the controller 4 determines whether an error of the read data can be corrected.

When the read-and-verify operation is executed immediately after the program operation as described above, the timing at which an operation corresponding to the write command is completed is equal to the timing at which the read-and-verify operation is completed. In the second comparative example, the timing at which the read-and-verify operation RV2 is completed is equal to the timing at which the operation corresponding to the write command is completed.

Therefore, the operation corresponding to the write command in the second comparative example is longer than the operation corresponding to the write command in the first comparative example by the processing time of the read-and-verify operation RV2.

In recent years, there are increasing opportunities to process a large amount of data. It is thus required to increase the data write speed. In contrast, a delay in data write time as described in the second comparative example cannot be ignored.

Figure 7:
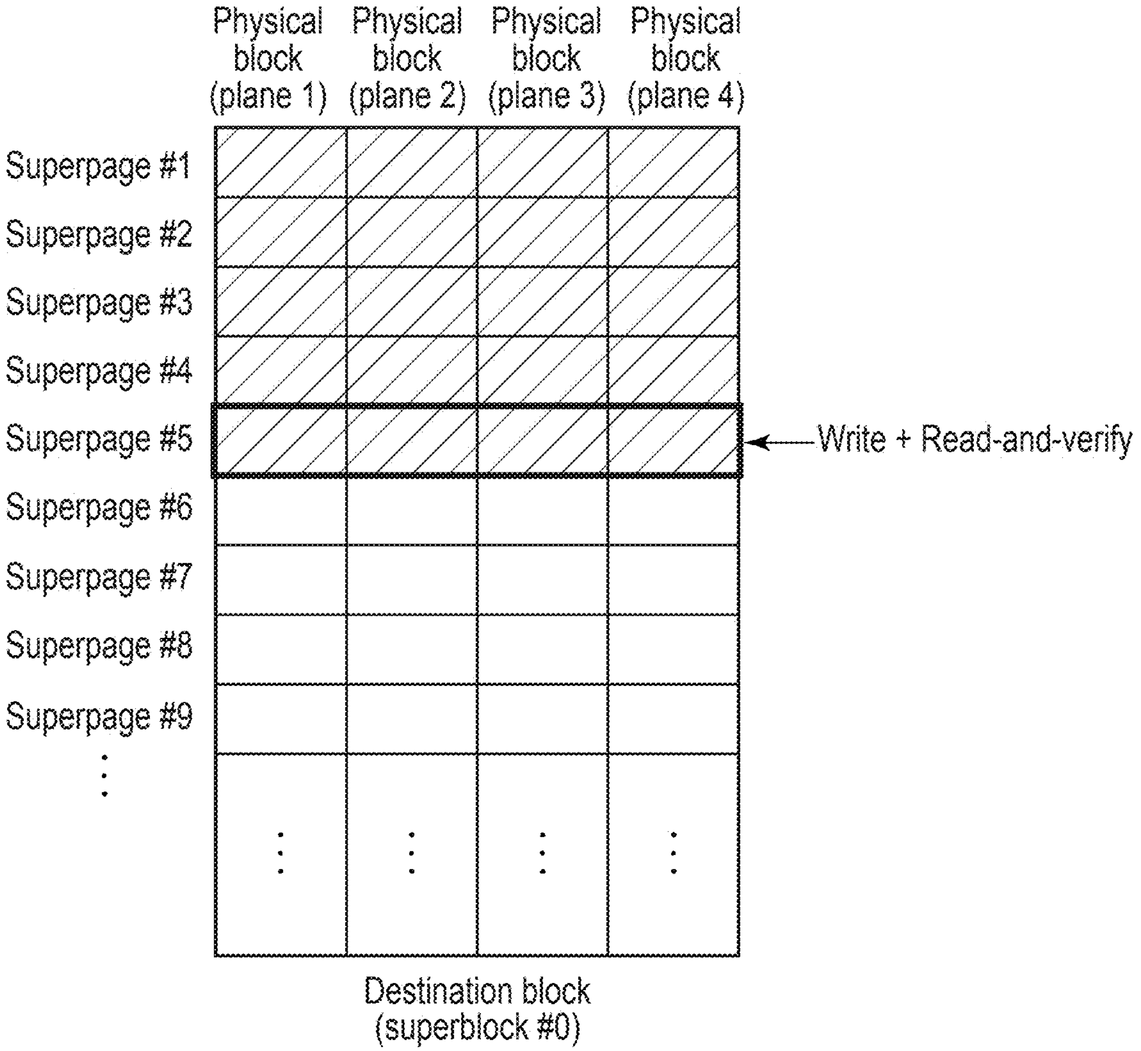
FIG. 7 is a diagram showing a write destination block in the second comparative example.

The relationship between a superpage for which a data write operation is performed and a superpage for which a read-and-verify operation is executed will be described with reference to FIG. 7. FIG. 7 is a diagram showing a write destination block in the second comparative example.

FIG. 7 shows a superblock #0 that is a write destination block. The superblock #0 includes four physical blocks selected one by one from four planes. Among a plurality of superpages of the write destination block, superpages #1 to #4 are ones to which data has already been written.

It is assumed that the controller 4 receives a write command from the host 2 to write data of a size corresponding to one superpage.

Then, the controller 4 selects a superpage #5 as a superpage to which data is written next. Upon receiving data to be written to the superpage #5, the controller 4 writes the data to the superpage #5.

Upon completion of the data write to the superpage #5, the controller 4 selects the superpage #5 to execute a read-and-verify operation.

The controller 4 reads data from the superpage #5 to determine whether its error can be corrected or not. If the number of error bits in the read data exceeds a threshold value, the controller 4 determines that the error can be corrected. In this case, the controller 4 uses the parity or the like to restore the read data.

In the memory system 3 according to the embodiment, the controller 4 executes a read-and-verify operation after receiving a write command and before transferring the data to the NAND flash memory 5.

Figure 8:
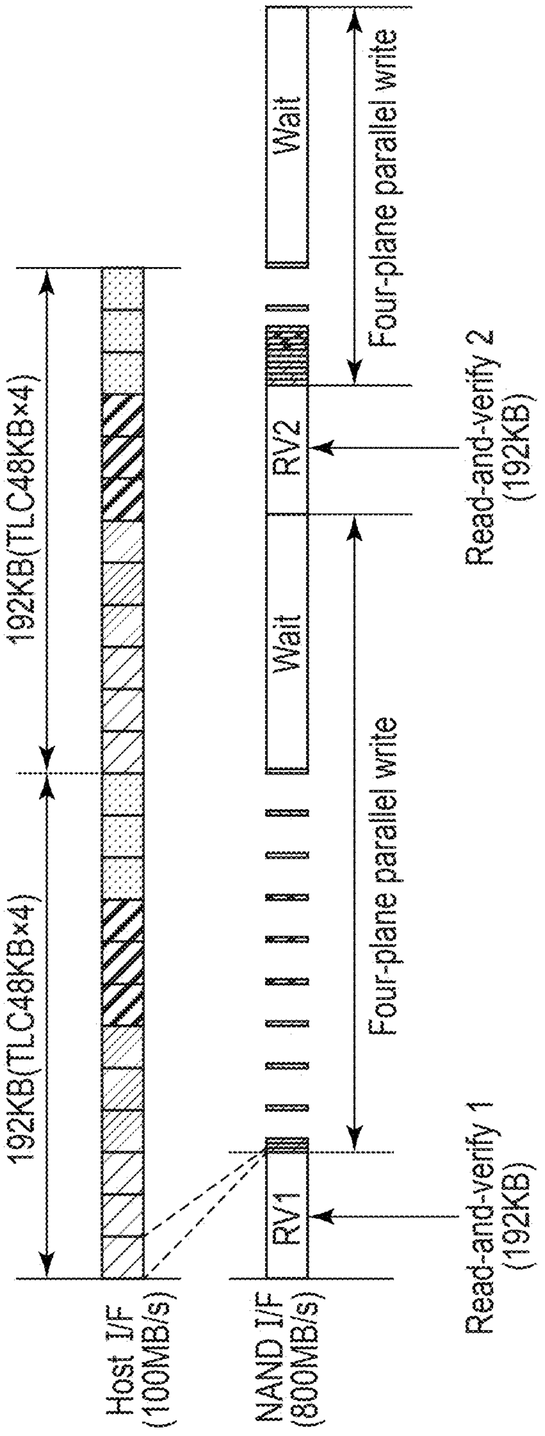
FIG. 8 is a diagram showing a first example of data transfer in a data write operation to be performed in the memory system according to the embodiment.

FIG. 8 is a diagram showing a first example of data transfer in a data write operation to be executed in the memory system 3 according to the embodiment. It is assumed that the transfer rate of the host I/F 41 is 100 MB/s and that of the NAND I/F 46 is 800 MB/s, as in the first and second comparative examples described above.

The host 2 transmits two write commands to the memory system 3.

Upon receiving a first write command from the host 2, the host I/F 41 of the controller 4 starts to receive write data associated with the received write command.

Upon receiving a first write command W1, the read-and-verify control circuit 422 of the controller 4 starts a read-and-verify operation RV1. The superpage to which data is to be written based on the first write command W1 is defined as a superpage L1.

In the read-and-verify operation RV1, the read-and-verify control circuit 422 selects a read-and-verify target page from a superpage to which data has already been written. For example, the read-and-verify control circuit 422 selects as a read-and-verify target a superpage corresponding to the same superpage number as the superpage L1 from among a plurality of superpages of the last write destination block. Alternatively, the read-and-verify control circuit 422 selects as a read-and-verify target an optional superpage among the active blocks or write destination blocks registered in the active block list 63.

The controller 4 reads data from the selected read-and-verify target superpage. The size of the data to be read is, for example, 192 KB. The ECC circuit 45 of the controller 4 determines whether an error of the read data can be corrected.

Upon completion of the read-and-verify operation RV1, the NAND I/F 46 of the controller 4 starts to transfer the write data associated with the first write command to the NAND flash memory 5. Since write data of several pages is received from the host 2 during the read-and-verify operation RV1, the NAND I/F 46 can transmit the write data of several pages continuously to the NAND flash memory 5 upon completion of the read-and-verify operation RV1.

As described above, while the host 2 is transferring data to the controller 4, the controller 4 executes the read-and-verify operation RV1. That is, the execution period of the read-and-verify operation RV1 can be overlapped with the period for transferring data from the host 2 to the controller 4. Thus, even if the read-and-verify operation RV1 is executed, the time required for processing the first write command can be prevented from lengthening.

When the data received from the host 2 reaches 16 KB, the write control circuit 421 instructs the NAND flash memory 5 to write the data. The NAND I/F 46 transfers write data of 16 KB to the NAND flash memory 5. Upon receiving write data of 192 KB by repeating the transfer of write data of 16 KB, the NAND flash memory 5 performs a program operation to write the received data.

Upon completion of a program operation corresponding to the first write command, the read-and-verify control circuit 422 starts the read-and-verify operation RV2 corresponding to the second write command.

Like in the read-and-verify operation RV1, in the read-and-verify operation RV2, the read-and-verify control circuit 422 selects a read-and-verify target page from a superpage to which data has already been written. For example, the read-and-verify control circuit 422 selects, as a read-and-verify operation superpage, a superpage having the same superpage number as that of a superpage to which data is to be written based on the second write command in the last write destination block.

The controller 4 reads data from the selected read-and-verify target superpage. The size of the read data is, for example, 192 KB. The ECC circuit 45 of the controller 4 determines whether an error of the read data can be corrected or not.

Upon completion of the transfer of write data associated with the first write command, the host I/F 41 starts to transfer the write data associated with the second write command. In the NAND flash memory 5, therefore, the host I/F 41 is receiving data associated with the next write command while the program operation and the read-and-verify operation RV2 corresponding to the first write command are being executed.

When the read-and-verify operation RV2 is completed, the write control circuit 421 instructs the NAND flash memory 5 to write data. Then, the NAND I/F 46 starts to transfer the write data associated with the second write command to the NAND flash memory 5. Since write data of several pages is received from the host 2 during the read-and-verify operation RV2, the NAND I/F 46 can transmit the write data of several pages continuously to the NAND flash memory 5 upon completion of the read-and-verify operation RV2.

If the data received from the host 2 reaches 16 KB, the NAND I/F 46 transfers the 16 KB write data to the NAND flash memory 5. Upon receiving write data of 192 KB by transferring the 16 KB write data repeatedly, the NAND flash memory 5 performs a program operation to write the received data.

As described above, the controller 4 also executes the read-and-verify operation RV2 while data is being transferred from the host 2 to the controller 4. That is, the execution period of the read-and-verify operation RV2 can be overlapped with the period for transferring data from the host 2 to the controller 4. Thus, even if the read-and-verify operation RV2 is executed, the time required for processing the second write command can be prevented from lengthening.

As described above, in the memory system 3 according to the embodiment, a read-and-verify operation executed immediately before a data write operation can prevent the time required for the data write operation from lengthening. Therefore, the time required for the data write operation can be shortened.

Figure 9:
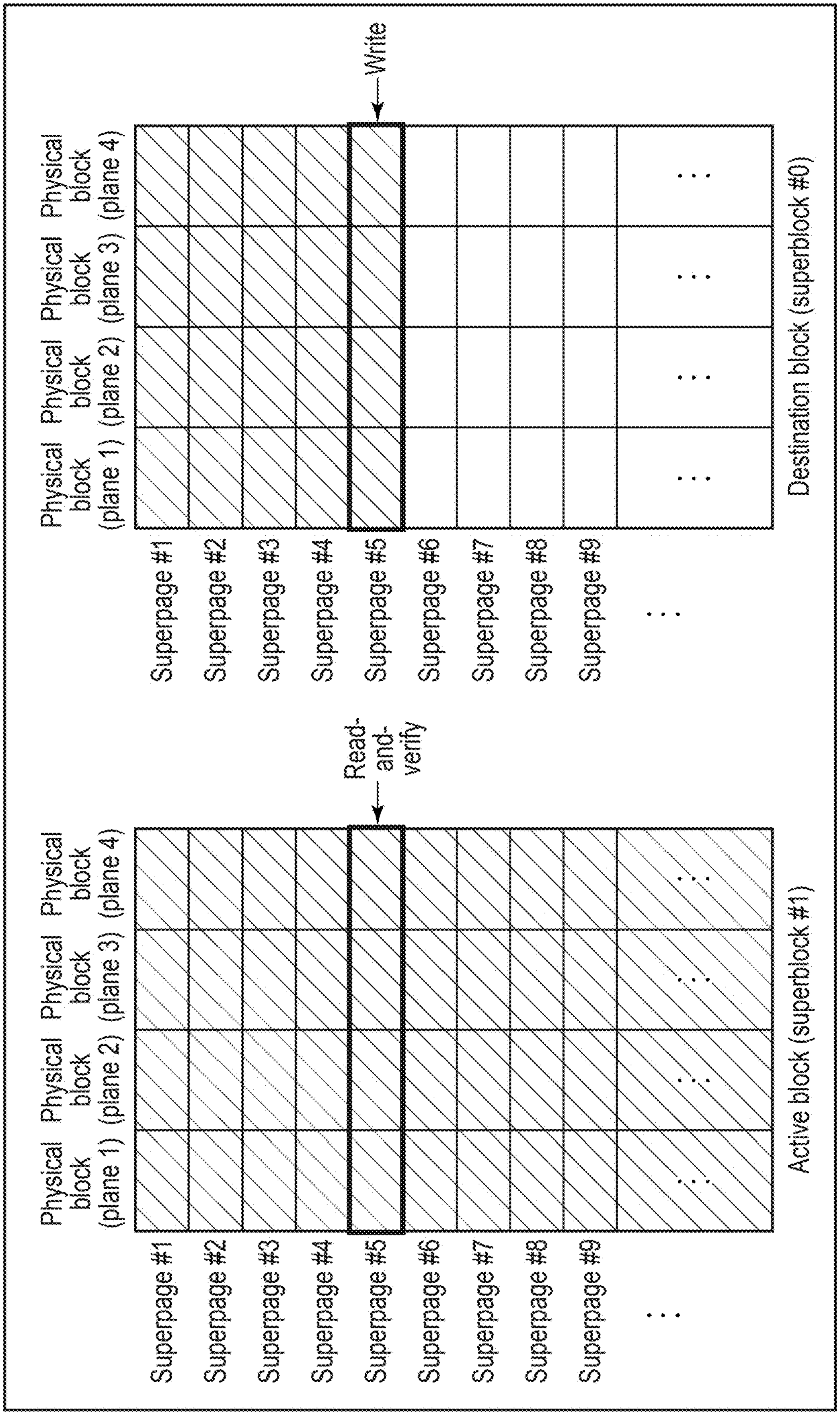
FIG. 9 is a diagram showing a write destination block and an active block in the memory system according to the embodiment.

The relationship between a superpage for a data write operation is performed and a superpage for which a read-and-verify operation is executed will be described with reference to FIG. 9. FIG. 9 is a diagram showing a write destination block and an active block in the memory system 3 according to the embodiment.

The superblock #0 is a write destination block. In the superblock #0, the superpages #0 to #4 are ones to which data has already been written. The superpage #5 of the superblock #0 is one to which data is to be written next.

The superblock #1 is a block allocated as a write destination block before the superblock #0. The superblock #1 is an active block containing at least valid data.

Here, the superpage #5 of the superblock 0 that is a write destination block is designated as a superpage to which data is to be written next.

Upon receiving a write command, the read-and-verify control circuit 422 of the controller 4 designates, as a read-and-verify target page, the superpage #5 of the superblock 1 that is an active block to which data has already been written. For example, the read-and-verify control circuit 422 designates the superblock 1 based on the block number for designating a superblock in the read-and-verify management information, and selects the superpage #5 having the same page number as the superpage of the write destination. The read-and-verify management information includes, for example, a block number corresponding to the last block to which data is written or corresponding to a block other than the write destination block.

In addition, the read-and-verify control circuit 422 may select as a read-and-verify target superpage an optional superpage to which data has already been written in the write destination block. For example, the read-and-verify control circuit 422 executes a read-and-verify operation for the superpage #1 of the superblock #0 when writing data to the superpage #5 of the superblock #0. At this time, the read-and-verify management information includes not only a block number indicating the superblock #0 but also a page number corresponding to the superpage #1.

As described above, the read-and-verify control circuit 422 of the controller 4 of the memory system 3 in the first example selects a read-and-verify target from among the superpages to which data has been written. That is, the controller 4 does not need to execute a read-and-verify operation immediately after performing a data write operation.

Next is a description of a case where data is written to two NAND chips connected to different channels.

Figure 10:
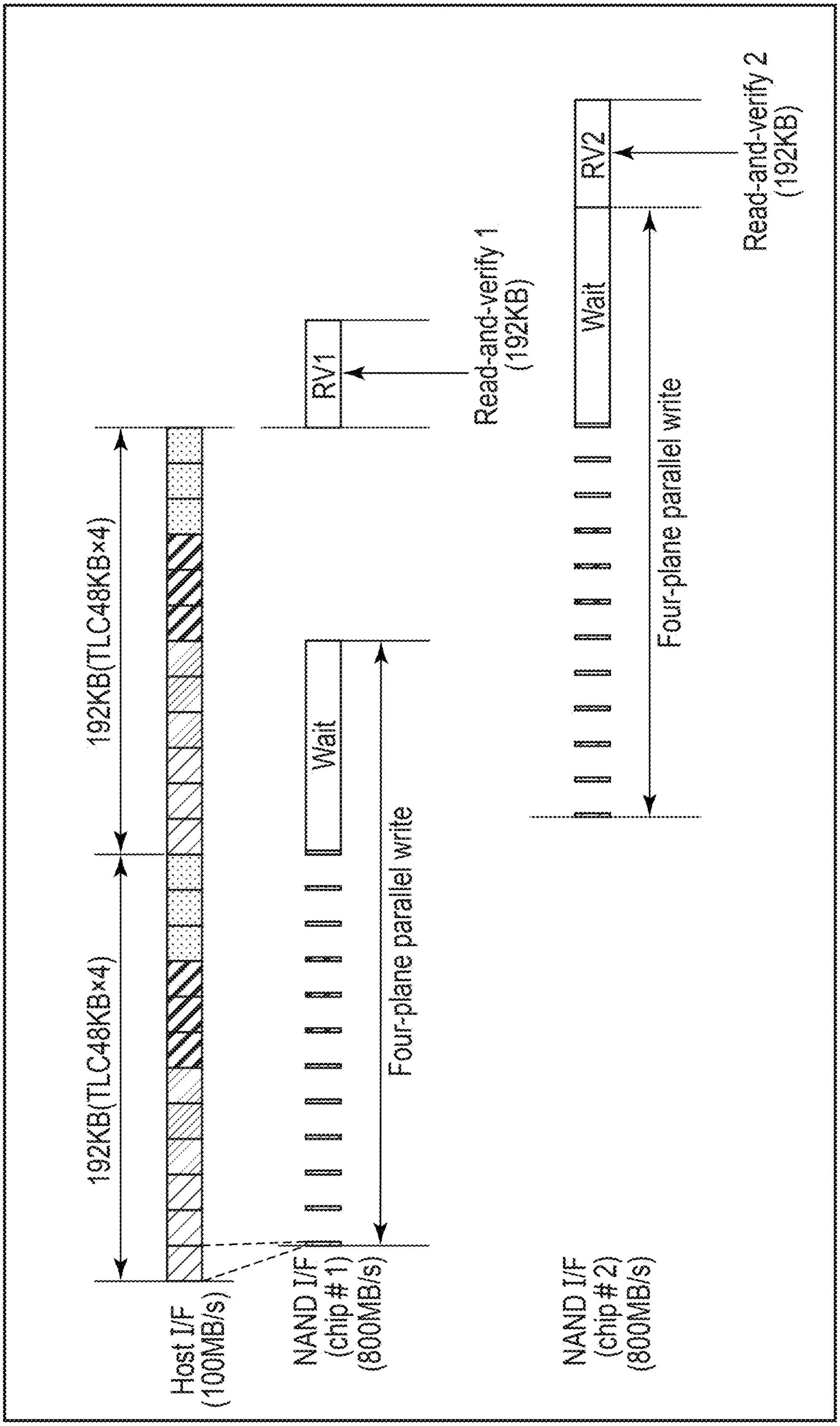
FIG. 10 is an illustration of data transfer in a data write operation in a third comparative example.

First, a third comparative example in which a read-and-verify operation is executed immediately after data is written to two NAND chips connected to different channels will be described with reference to FIG. 10. FIG. 10 is an illustration of data transfer in a data write operation in the third comparative example.

It is assumed that a first write command requesting data write to the NAND chip #1 and a second write command requesting data write to the NAND chip #2 are issued.

First, upon receiving the first write command, the host I/F 41 of the controller 4 starts to receive data associated with the received write command.

Each time the received data reaches 16 KB, the controller 4 transfers the data to the NAND chip #1 via the NAND I/F 46. If the received data reaches 192 KB, the NAND chip #1 performs a program operation to write the data.

Upon completion of the reception of data associated with the first write command, the host I/F 41 of the controller 4 starts to receive data associated with the second command. Each time the received data reaches 16 KB, the controller 4 transfers the data to the NAND chip #2 via the NAND I/F 46. If the received data reaches 192 KB, the NAND chip #2 performs a program operation to write the data.

Upon completion of the transfer of data to the NAND chip #2, the controller 4 executes a read-and-verify operation RV1 for the NAND chip #1. In the read-and-verify operation RV1, the controller 4 reads data of 192 KB that has been written just before. The controller 4 determines whether an error of the read data can be corrected or not. If the error cannot be corrected, the controller 4 corrects the error using the parity or the like.

When the program operation for the NAND chip #2 completes, the controller 4 executes a read-and-verify operation RV2 for the NAND chip #2. In the read-and-verify operation RV2, the controller 4 reads data of 192 KB that has been written just before. The controller 4 determines whether an error of the read data can be corrected or not. If the error cannot be corrected, the controller 4 corrects the error using the parity or the like.

Even though data is written to two NAND chips as described above, the timing of completion of the second write command becomes equal to the timing of completion of the read-and-verify operation RV2.

The time of processing corresponding to the write command in the third comparative example becomes longer by the processing time of the read-and-verify operation RV2 than that in the case where no read-and-verify operation is executed.

Figure 11:
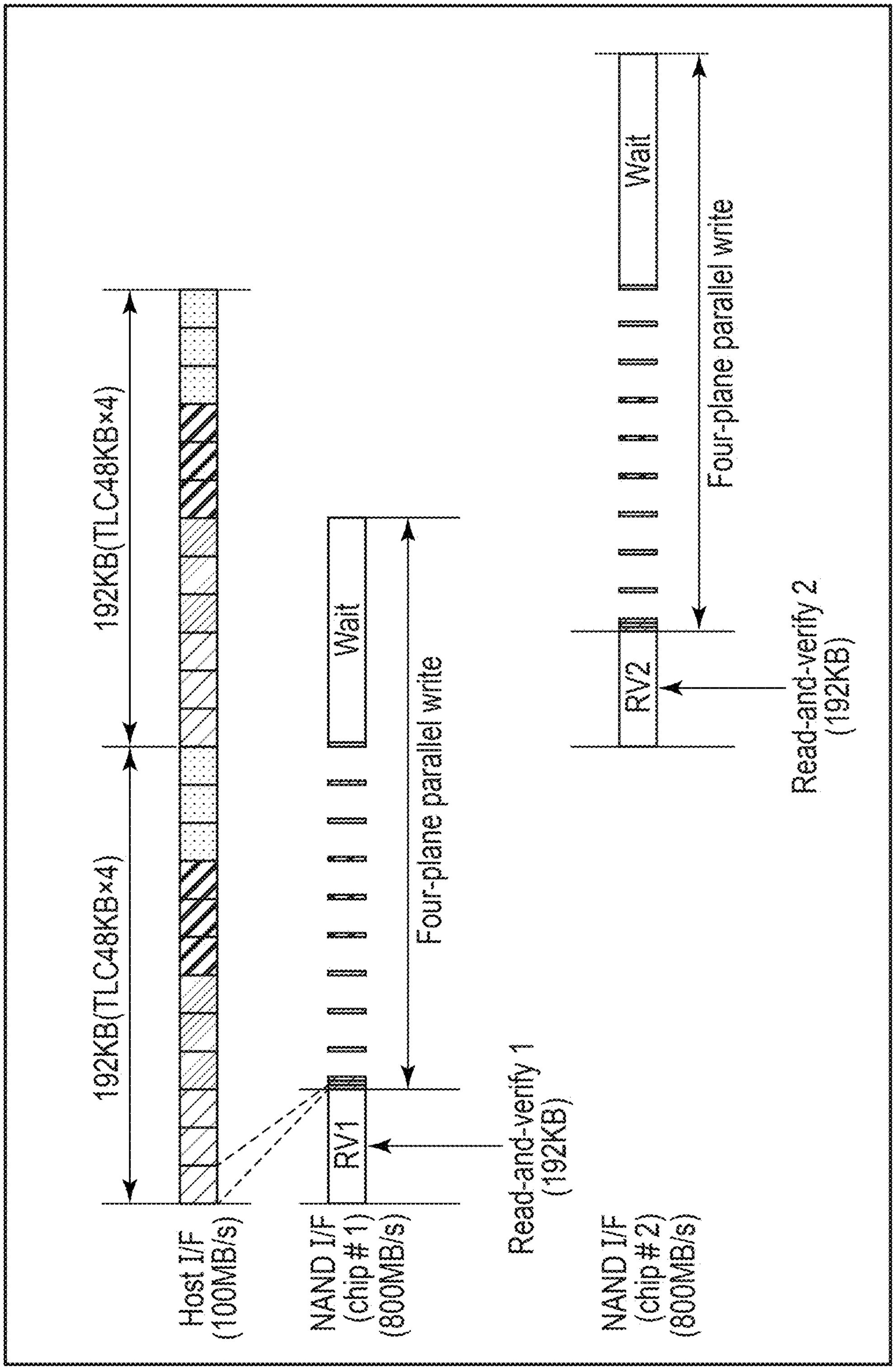
FIG. 11 is a diagram showing a second example of the data transfer in a data write operation to be performed in the memory system according to the embodiment.

A second example in which a read-and-verify operation is executed before a data write operation to two NAND chips connected to different channels, will be described below with reference to FIG. 11. FIG. 11 is a diagram illustrating a second example of the data transfer in a data write operation to be executed in the memory system 3 according to the embodiment.

Is assumed that a first write command requesting data write to the NAND chip #1 and a second write command requesting data write to the NAND chip #2 are issued.

First, upon receiving the first write command, the host I/F 41 of the controller 4 starts to receive data associated with the received write command.

The read-and-verify control circuit 422 of the controller 4 determines as a read-and-verify target a superpage of the NAND chip #1 to which data has already been written and which is indicated by the read-and-verify management information. For example, the read-and-verify control circuit 422 determines as a read-and-verify target a superpage having the same page number as a superpage to which data associated with the first write command is to be written in the last write destination block. The read-and-verify control circuit 422 executes the read-and-verify operation RV1 for the determined read-and-verify target superpage.

Upon completion of the read-and-verify operation RV1, the write control circuit 421 of the controller 4 transfers data to the NAND chip #1 via the NAND I/F 46 each time the received data reaches 16 KB. When the received data reaches 192 KB, the NAND chip #1 performs a program operation to write the data.

Upon completion of the reception of the write data associated with the first write command, the host I/F 41 of the controller 4 starts to receive the write data associated with the second write command.

The read-and-verify control circuit 422 of the controller 4 determines as a read-and-verify target a page of the NAND chip #2 to which data has already been written and which is indicated by the read-and-verify management information. For example, the read-and-verify control circuit 422 determines as a read-and-verify target a page having the same page number as a page to which data associated with the second write command is to be written in the last write destination block as a read-and-verify operation object. The read-and-verify control circuit 422 performs the read-and-verify operation RV2 for the determined read-and-verify target page.

In the read-and-verify operation RV2, the controller 4 reads 192 KB data from the read-and-verify target page. The ECC circuit 45 of the controller 4 determines whether an error of the read data can be corrected. If the error cannot be corrected, the controller 4 corrects the error of the read data using the parity or the like.

Upon completion of the read-and-verify operation RV2, the write control circuit 421 of the controller 4 transfers data to the NAND chip #2 via the NAND I/F 46 each time the received data reaches 16 KB. When the received data reaches 192 KB, the NAND chip #2 performs a program operation to write the data.

As described above, in the second example, the read-and-verify operation RV2 can be executed while the data associated with the second write command is transferred from the host 2 to the controller 4, as compared with the third comparative example described with reference to FIG. 10. That is, the execution period of the read-and-verify operation RV2 can be overlapped with the period for transferring data from the host 2 to the controller 4. Even if the read-and-verify operation RV2 is executed, the memory system 3 of the second example can prevent the time required for processing the second write command from lengthening.

In the memory system 3 according to the second example, even though data is written to two NAND chips as described above, the time required for a data write operation can be prevented from lengthening.

Figure 12:
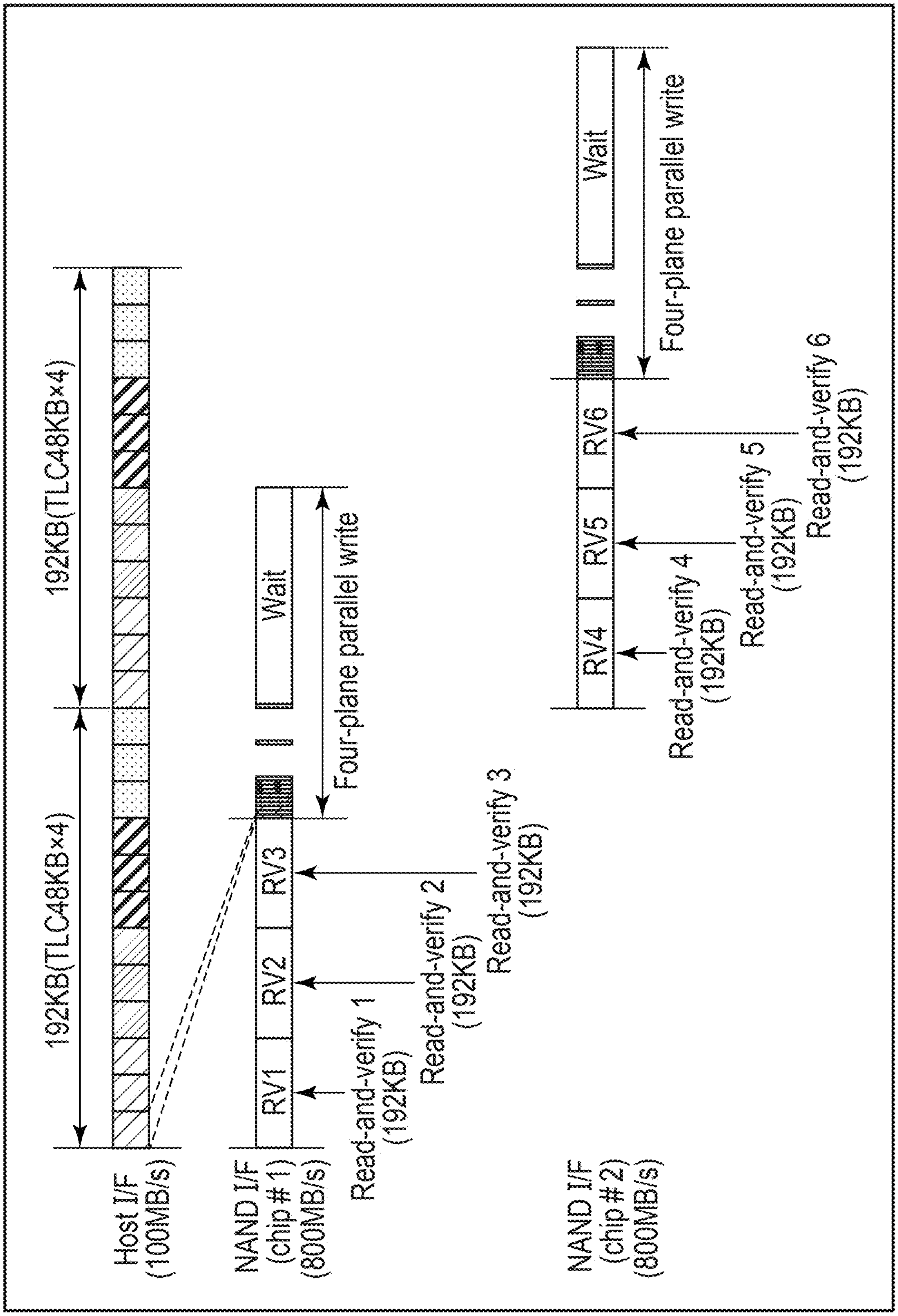
FIG. 12 is a diagram showing a third example of the data transfer in a data write operation to be performed in the memory system according to the embodiment.

A third example in which a read-and-verify operation is executed for three pages prior to a data write operation to two NAND chips connected to different channels will be described below with reference to FIG. 12. FIG. 12 is a diagram illustrating a third example of data transfer in a data write operation to be executed in the memory system 3 according to the embodiment.

FIG. 12 shows a read-and-verify operation to be executed for three pages. However, the number of pages for which a read-and-verify operation is to be executed may be two or four or more.

It is assumed that a first write command requesting data write to the NAND chip #1 and a second write command requesting data write to the NAND chip #2 are issued.

First, upon receiving the first write command, the host I/F 41 of the controller 4 starts to receive data associated with the received write command.

The read-and-verify control circuit 422 of the controller 4 determines as a read-and-verify target a superpage of the NAND chip #1 to which data has already been written and which is indicated by the read-and-verify management information. For example, the read-and-verify control circuit 422 determines as a read-and-verify target a superpage indicated by a block number and a page number in the read-and-verify management information. The read-and-verify control circuit 422 executes a read-and-verify operation RV1 for the determined read-and-verify operation superpage.

Upon completion of the read-and-verify operation RV1, the read-and-verify control circuit 422 determines a next read-and-verify operation RV2 target superpage based on the read-and-verify management information. The read-and-verify control circuit 422 determines a superpage indicated by the read-and-verify management information, as a read-and-verify target. The read-and-verify control circuit 422 executes the read-and-verify operation RV2 for the determined read-and-verify target superpage.

Upon completion of the read-and-verify operation RV2, the read-and-verify control circuit 422 determines a next read-and-verify operation RV3 target superpage based on the read-and-verify management information. The read-and-verify control circuit 422 determines a superpage indicated by the read-and-verify management information, as a read-and-verify target. The read-and-verify control circuit 422 executes the read-and-verify operation RV3 for the determined read-and-verify target superpage.

Upon completion of the read-and-verify operation RV3, the write control circuit 421 of the controller 4 transfers data to the NAND chip #1 via the NAND I/F 46 each time the data received from the host 2 reaches 16 KB. When the received data reaches 192 KB, the NAND chip #1 performs a program operation to write the data.

Upon completion of the reception of the data associated with the first write command, the host I/F 41 of the controller 4 starts to receive the data associated with the second command.

The read-and-verify control circuit 422 of the controller 4 determines as a read-and-verify target a superpage of the NAND chip #2 to which data has already been written and which is indicated by the read-and-verify management information. For example, the read-and-verify control circuit 422 determines as a read-and-verify target a superpage indicated by a block number and a page number in the read-and-verify management information. The read-and-verify control circuit 422 executes a read-and-verify operation RV4 for the determined read-and-verify target superpage.

Upon completion of the read-and-verify operation RV4, the read-and-verify control circuit 422 determines a next read-and-verify operation RV5 target page based on the read-and-verify management information. The read-and-verify control circuit 422 determines a page indicated by the read-and-verify management information as a read-and-verify target. The read-and-verify control circuit 422 executes a read-and-verify operation RV5 for the determined read-and-verify target page.

Upon completion of the read-and-verify operation RV5, the read-and-verify control circuit 422 determines a next read-and-verify operation RV6 target page based on the read-and-verify management information. The read-and-verify control circuit 422 determines a page indicated by the read-and-verify management information a read-and-verify target. The read-and-verify control circuit 422 executes a read-and-verify operation RV6 for the determined read-and-verify target page.

Upon completion of the read-and-verify operation RV6, the read-and-verify control circuit 422 transfers data to the NAND chip #2 via the NAND I/F 46 each time the received data reaches 16 KB. When the received data reaches 192 KB, the NAND chip #2 performs a program operation to write the data.

In the third example, even though data is written to two NAND chips as described above, the read-and-verify operation executed immediately before a data write operation can prevent the time required for the data write operation from lengthening.

Figure 13:
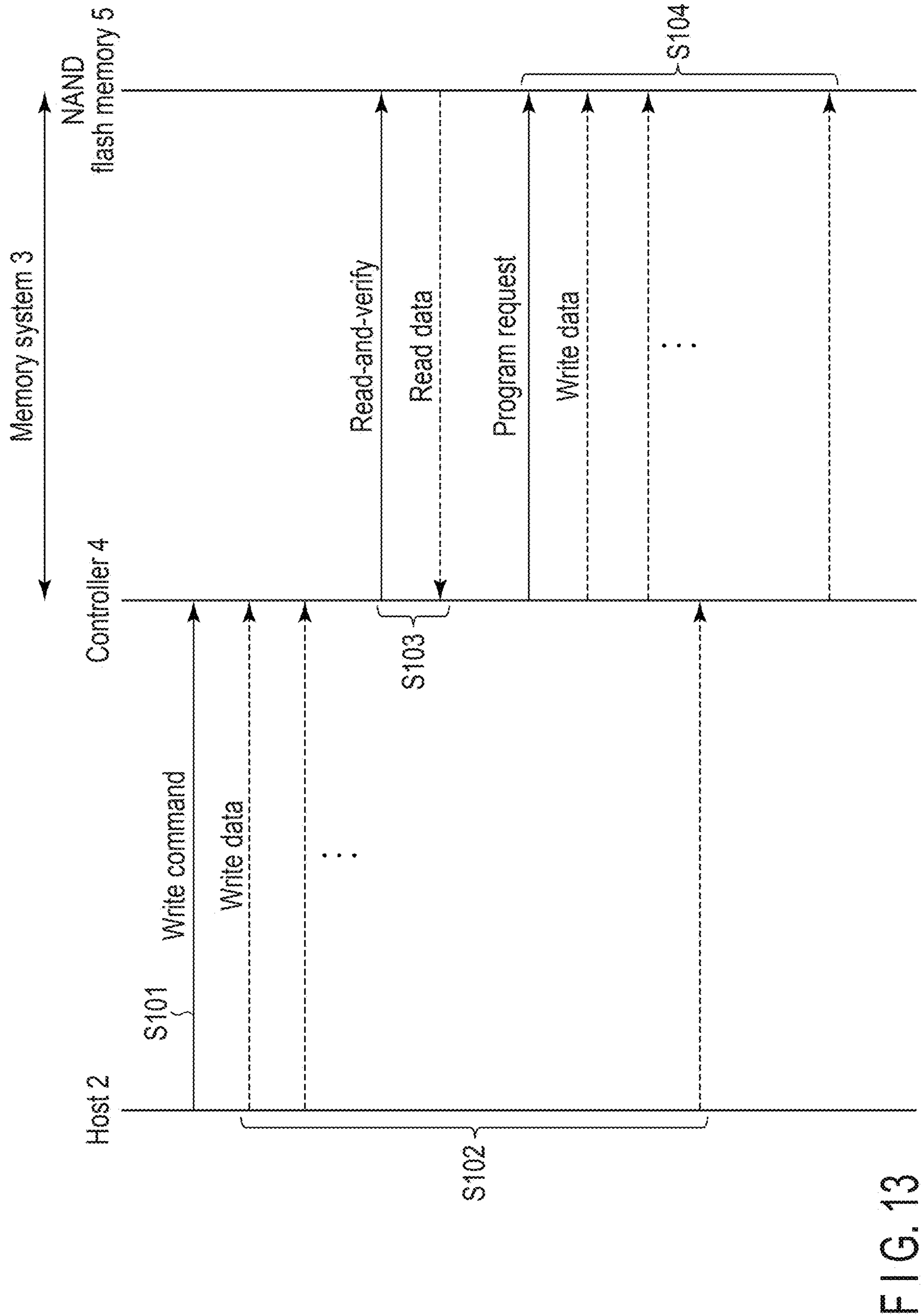
FIG. 13 is a sequence diagram showing a procedure for performing a data write operation in an information processing system including the memory system according to the embodiment.

Next is a description of a procedure of a data write operation to be executed in the information processing system 1 including the host 2 and the memory system 3. FIG. 13 is a sequence diagram showing a procedure for executing a data write operation in the information processing system 1 including the memory system 3 and host 2 according to the embodiment.

First, the host 2 transmits a write command to the controller 4 of the memory system 3 (step S101).

Then, the host 2 transmits data associated with the write command transmitted in step S101 to the controller 4 (step S102).

Upon receiving the write command in step S101, the controller 4 executes a read-and-verify operation for the data already written to the NAND flash memory 5 (step S103). Although FIG. 13 shows a case where the read-and-verify operation in S103 is executed after the start of transfer of the write data in S102, the read-and-verify operation in S103 may be started before the start of transfer of the write data in S102. In the read-and-verify operation, the controller 4 reads a read-and-verify target data from the NAND flash memory 5. Then, the controller 4 determines whether an error of the read data can be corrected. If the error cannot be corrected, the controller 4 restores the read data using the parity or the like.

The controller 4 transmits to the NAND flash memory 5 a program request for writing data associated with the write command received in step S101 (step S104). The controller 4 transmits write data to the NAND flash memory 5, for example, each time data having a size corresponding to a physical page is stored. When the received write data reaches a data size capable of a program operation, the NAND flash memory 5 performs the program operation.

Figure 14:
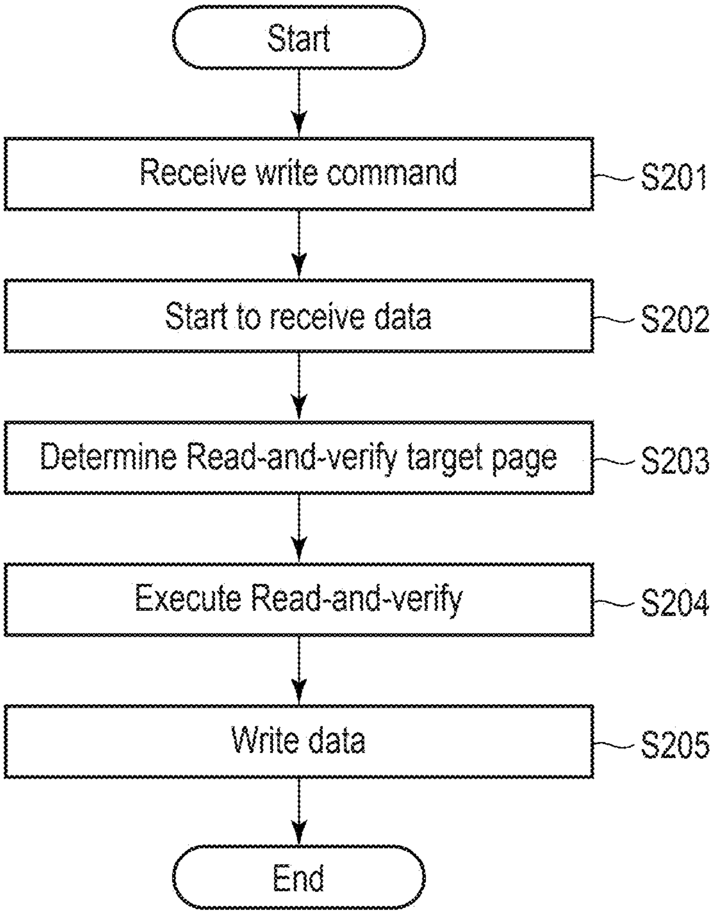
FIG. 14 is a flowchart showing a procedure for performing a data write operation in the memory system according to the embodiment.

Next is a description of a procedure for a data write operation in the controller 4. FIG. 14 is a flowchart showing a procedure for performing a data write operation in the memory system 3 according to the embodiment.

The controller 4 of the memory system 3 receives a write command from the host 2 (step S201).

The controller 4 starts to receive data associated with the write command received in step S201 (step S202).

The controller 4 determines a read-and-verify target page (step S203). The controller 4 determines the read-and-verify target page based on the read-and-verify management information. For example, the controller 4 determines as a read-and-verify target page a superpage having the same superpage number as a superpage to which data is to be written based on the write command received in S201 among the last write destination blocks.

The controller 4 executes a read-and-verify operation for the read-and-verify target page determined in step S203 (step S204). In the read-and-verify operation, the controller 4 reads a read-and-verify target data from the NAND flash memory 5. Then, the controller 4 determines whether an error of the read data can be corrected. If the error cannot be corrected, the controller 4 restores the read data using the parity or the like.

Upon completion of reception of the data in step 202, the controller 4 writes the received data to the NAND flash memory 5 (step S205).

As described above, in the data write operation, the controller 4 of the memory system 3 according to the embodiment executes a read-and-verify operation upon receipt of a write command. Upon completion of the read-and-verify operation, the controller 4 transmits the write data to the NAND flash memory 5. Then, the controller 4 executes a read-and-verify operation for a superpage to which data has already been written and for which no read-and-verify operation has been executed.

Upon completion of the read-and-verify operation, the controller 4 transmits the write data from the host 2 to the NAND flash memory 5. The controller 4 transmits the write data to the NAND flash memory 5 each time the write data received from the host 2 reaches the size of a write unit.

As described above, in the memory system 3 according to the embodiment, the read-and-verify operation processing time is in the transfer time of write data from the host 2. That is, the controller 4 can execute a read-and-verify operation while receiving write data from the host 2. The controller 4 can thus shorten the time required for the write operation as compared with the case where the read-and-verify operation is executed after the program operation.

Thus, the controller 4 can perform the data write operation with efficiency.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, comprising:

a nonvolatile memory including physical blocks, each of the physical blocks is a unit of a data erasure operation; and a controller electrically connected to the nonvolatile memory and configured to write data to the nonvolatile memory and execute a read-and-verify operation to determine whether the data is to be read from the nonvolatile memory normally, wherein:

each of the physical blocks includes physical pages, each of the physical pages is a unit of a data write operation and a data read operation; and the controller is configured to, upon receiving a first write command from the host:

start to receive first data associated with the first write command;

select one of a plurality of first pages, wherein second data has already been written to the plurality of first pages and no read-and-verify operation has been executed for the plurality of first pages;

execute a read-and-verify operation for the selected one of the plurality of first pages in parallel with reception of the first data; and write the received first data to a second page in a write destination block among the physical blocks when the read-and-verify operation has been executed.

2. The memory system of claim 1, wherein the one of the plurality of first pages is in a physical block of the physical blocks, wherein the second data has been written to the physical block and the one of the plurality of first pages has a page number equal to a page number of the second page.

3. The memory system of claim 1, wherein the controller is configured to:

select two or more third pages from the plurality of first pages; and execute the read verify for the selected two or more third pages.

4. The memory system of claim 3, wherein the controller is configured to manage management information including a block number and page numbers, the block number indicative of a block including the two or more third pages, the page numbers corresponding to the two or more third pages, the read-and-verify operation having been executed for each of the two or more third pages.

5. The memory system of claim 1, wherein the controller is configured to:

restore the second data to be written to the one of the plurality of first pages when the second data cannot be correctly read from the one of the plurality of first pages in the read-and-verify operation; and execute an operation to write the restored second data to the nonvolatile memory.

6. The memory system of claim 1, wherein the memory system conforms to a secure digital card.

7. The memory system of claim 1, wherein:

the nonvolatile memory includes two or more chips operable in parallel;

each of the two or more chips includes the physical blocks; and upon receiving from the host a second write command for writing third data to a first chip of the two or more chips and a third write command for writing fourth data to a second chip of the two or more chips, the controller is configured to:

start to receive the third data associated with the second write command;

select a fourth page from at least one page of the first chip, to which fifth data has already been written and for which no read-and-verify operation has been executed;

execute the read-and-verify operation for the selected fourth page;

write the received third data to a fifth page that is a write destination page of a write destination block in the first chip;

start to receive the fourth data associated with the third write command upon completion of reception of the third data;

select a sixth page from at least one page of the second chip, to which sixth data has already been written and for which no read-and-verify operation has been executed;

execute the read-and-verify operation for the selected sixth page; and write the received fourth data to a seventh page that is a write destination page of a write destination block in the second chip.

8. A memory system connectable to a host, comprising:

a nonvolatile memory including physical blocks, each of the physical blocks is a unit of a data erasure operation; and a controller electrically connected to the nonvolatile memory and configured to write data to the nonvolatile memory and execute a read-and-verify operation to determine whether the data is to be read from the nonvolatile memory normally, wherein each of the physical blocks includes physical pages, each of the physical pages is a unit of a data write operation and a data read operation; and the controller is configured to:

manage logical blocks each including two or more physical blocks, each of the logical blocks including logical pages each including two or more physical pages;

execute a data write operation in units of logical pages in a write destination logical block;

upon receiving a first write command from the host, start to receive first data associated with the first write command;

select a first logical page from the logical pages, to which the first data has already been written and for which no read-and-verify operation has been executed;

execute a read-and-verify operation for the first logical page in parallel with reception of the first data; and write the first data to a second logical page in a write destination logical block of the logical blocks when the read-and-verify operation has been executed.

9. A control method for controlling a memory system connectable to a host, the method comprising:

upon receiving a write command from the host, receiving first data associated with the write command received from the host;

selecting a first page from pages of physical pages in a nonvolatile memory of the memory system, to which second data has already been written and for which no read-and-verify operation has been executed;

executing a read-and-verify operation for the selected first page in parallel with reception of the first data; and writing the received first data to a second page in a write destination block among physical blocks in the nonvolatile memory when the read-and-verify operation has been executed.

* * * * *